Dec. 14, 1954 W. A. CORNELL ET AL 2,697,140

ELECTRONIC TESTING SYSTEM

Filed Dec. 20, 1949 3 Sheets-Sheet 1

INVENTORS W. A. CORNELL
N. I. HALL
H. E. POWELL

BY J W Schmied
ATTORNEY

W. A. CORNELL
INVENTORS N. I. HALL
H. E. POWELL
BY J. W. Schmied
ATTORNEY

Dec. 14, 1954 W. A. CORNELL ET AL 2,697,140

ELECTRONIC TESTING SYSTEM

Filed Dec. 20, 1949 3 Sheets-Sheet 3

INVENTORS W. A. CORNELL
N. I. HALL
H. E. POWELL

BY J W Schmied
ATTORNEY

United States Patent Office 2,697,140 Patented Dec. 14, 1954

2,697,140

ELECTRONIC TESTING SYSTEM

Warren A. Cornell, Levittown, N. Y., Nathan I. Hall, West Los Angeles, Calif., and Harold E. Powell, Clifton, N. J., assignors to Bell Telephone Laboratories, Incorporated, New York, N. Y., a corporation of New York Application December 20, 1949, Serial No. 134,106

23 Claims. (Cl. 179—175.2)

Figures 1, 4:
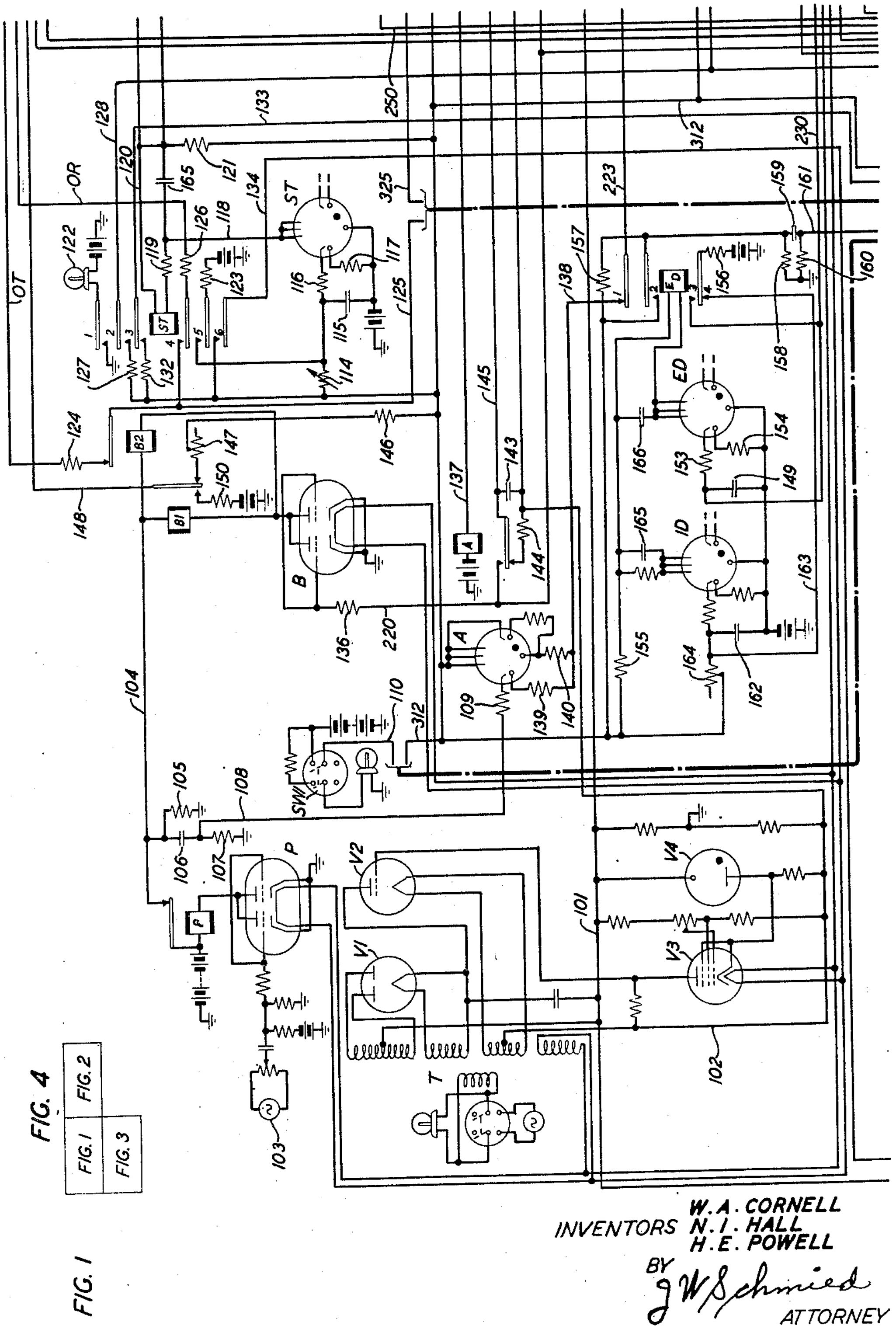

This invention relates to an electrical testing system and more particularly to an automatic system for testing the operation of a telephone switching system.

An object of this invention is to provide electronic circuits and apparatus for testing telephone switching systems at a high rate of speed.

Another object of this invention is to provide an automatic test system operable repetitively to place calls through an automatic telephone switching system.

A further object of this invention is to provide a testing apparatus operable cylically and fully to simulate the operations normally performed by calling and called subscribers in an automatic telephone switching system and to indicate trouble conditions encountered.

A feature of this invention is the provision of means for originating a call on selected lines, for then waiting for dial tone, and for detecting the recipt of dial tone.

Another feature of this invention is an electronically controlled means for transmitting series of pulses simulating the dialing of a selected telephonic designation.

Another feature of this invention is an electronic means for controlling and adjusting the period elapsing between the transmission of successive groups of pulses to establish a selectable interdigital time.

Another feature of this invention is a means operable to detect the recipt of ringing voltage, to test that this voltage is transmitted over the proper conductor, and to hereafter trip ringing.

Another feature of this invention is an electronically controlled means for holding the communication path in the talking condition for a selectable period of time.

Another feature of this invention is the provision of means for releasing both the calling and called lines at the end of the talking period and thereafter automatically placing another call after a predetermined time interval.

A further feature of this invention is an alarm circuit operable if ringing voltage is not received within a predetermined time after dial tone is received, and capable of blocking further operation of the test circuit when an alarm condition occurs.

In general, the subject system provides a means for automatically and continuously accomplishing the functions normally performed by the calling and called subscribers in an automatic telephone switching system. Means are provided to bridge the calling subscriber's line to simulate the closing of the switchhook contacts. The system then waits for dial tone and operates in response thereto to transmit dial pulses representing a selected called subscriber's telephonic designation. Means are provided to vary the duration of the individual dial pulses and other means serve to control the interdigital time, i. e., the delay between successive series of pulses representing successive digits of the selected telephonic designation. The system is then operative to perform the functions of the called subscriber, functioning to recognize ringing current and to then trip ringing after a predetermined interval by bridging the called subscriber's line. The circuits in the system under test may then be held in the equivalent of the talking condition for an optional time interval after which both the calling and called subscribers' lines will be released. The apparatus then automatically repeats the above functions, delaying for a selectable interval between successive calls.

Time-out circuits are provided to create an alarm condition, and, if desired, to block the operation of the subject test system when such a condition arises, if the system under test fails properly to respond to the establishing of a call therethrough.

Figure 2:
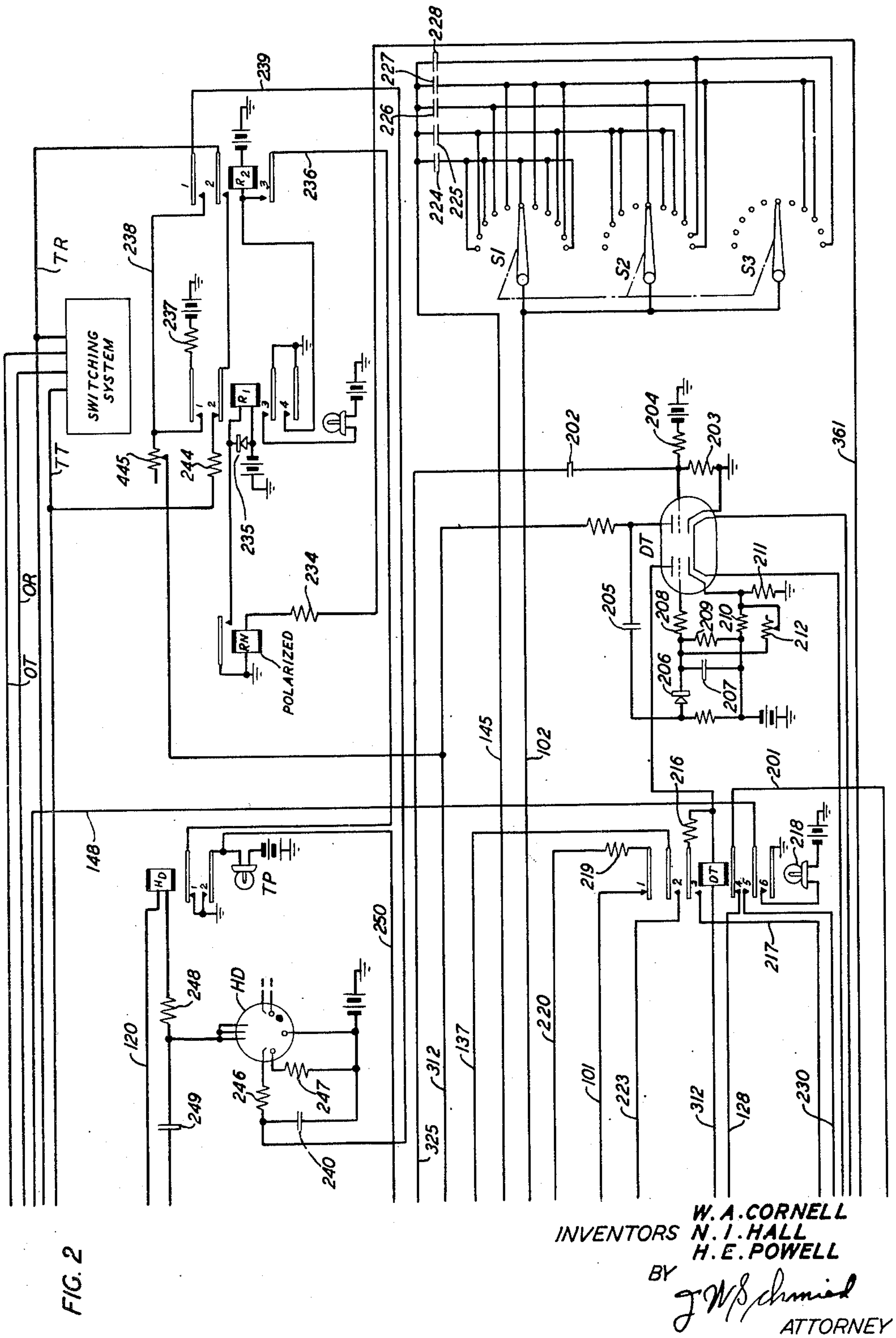
Figure 3:
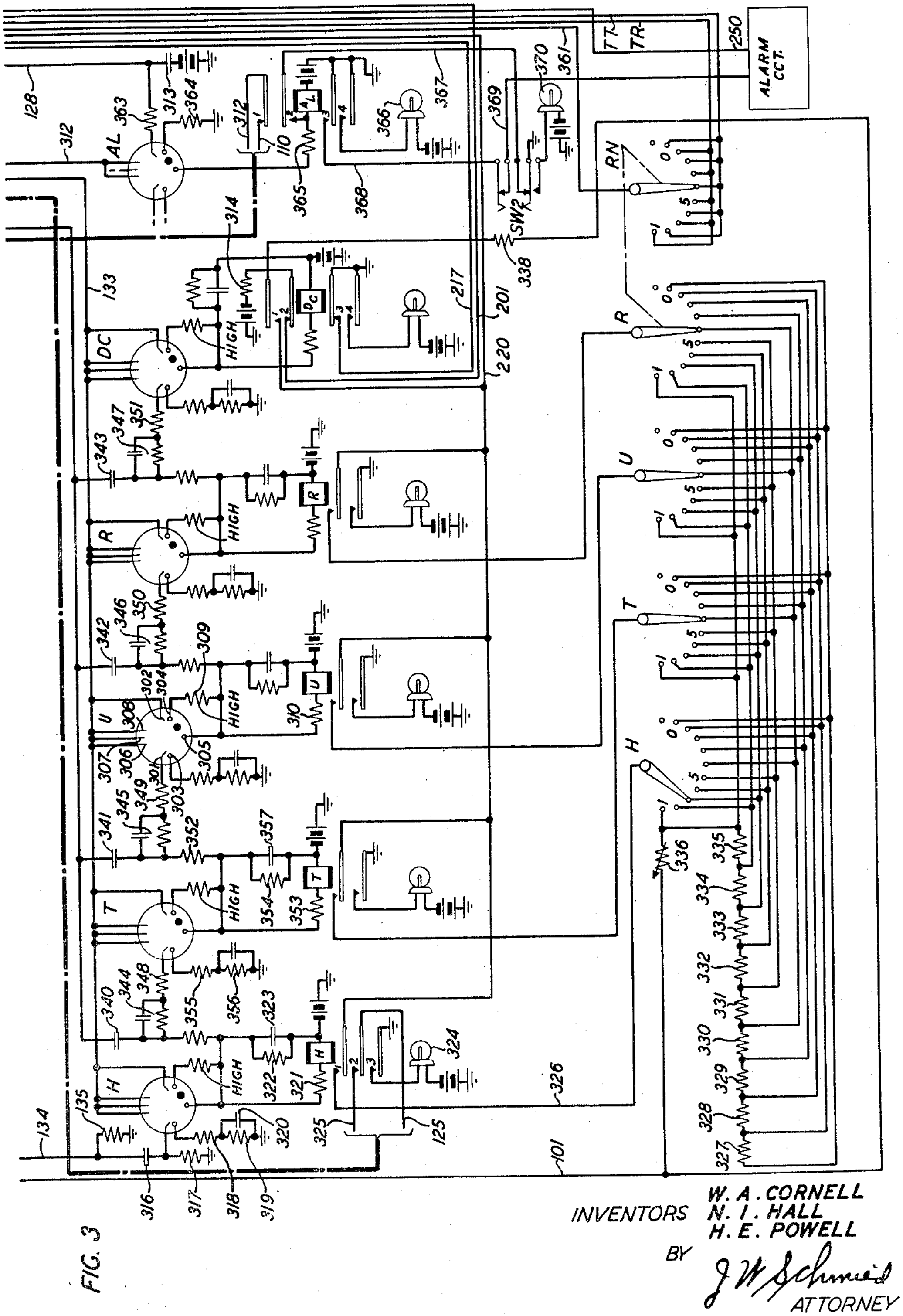

A more complete understanding of the above-mentioned and other features of the invention may be obtained from the following description of the functioning of an illustrative embodiment thereof, when read with reference to the accompanying drawings, in which:

Fig. 1 discloses an exemplary power supply, and a start circuit, a dial pulse transmitting circuit and an interdigital time control circuit constructed in accordance with the principles of the invention;

Fig. 2 discloses a dial tone responsive circuit, a ringing current responsive circuit and a circuit operative to trip ringing;

Fig. 3 discloses means means for selecting and controlling the transmission of the pulses representing the digits of the called telephonic designation and a time-out circuit; and Fig. 4 shows the method of arrangement of the several figures of the drawing.

Throughout the specification, the circuit elements will be identified by functional designations followed by a number in parentheses representing the figure of the drawing upon which that element appears. For example, the dial tone responsive relay in Fig. 2 of the drawing will hereinafter be designated "relay DT(2)."

The eight-element electron discharge devices utilized in the disclosed preferred embodiment of the invention are cold cathode gas-filled tubes preferably of the type more fully disclosed in the copending application of W. A. Depp, Serial No. 13,283, filed March 5, 1948. As shown, for example, in Fig. 3, the units control tube U(3) comprises two control anodes 301 and 302, two control cathodes 303 and 304, a main cathode 305, and three main anodes 306, 307 and 308. In general, the application of a suitable potential difference between either the control anode 301 and control cathode 303, or between the control cathode 302 and control cathode 304 will cause a discharge to occur across the control gap therebetween. With a suitable voltage applied to any one of the main anodes 306, 307 or 308, the control gap discharge will be transferred so as to exist between the control cathode 303 or 304 and the main anode 306, 307 or 308. If the main cathode 305 is at a voltage sufficiently negative in respect to the control cathode 303 or 304, the discharge will then transfer to the main gap so as to exist between the main cathode 305 and the main anode 306, 307 or 308. This sequence will hereinafter be referred to as a control gap discharge followed by first and second transfers of discharge.

Since rapidity of operation is an object in this system, it may here be noted that provision is made to decrease the ionization time of certain of the critical gaseous discharge tubes employed in the system herein disclosed. For example, the circuit of tube U(3) is arranged so that a minute "keep-alive" current flows across the right-hand control gap thereof while that tube is in its non-conducting state. Prior to the time that a suitable positive potential is applied to the left-hand control anode 301, as will be described hereinafter, a suitable main anode potential, such as positive 135 volts, is applied to the main anodes 306, 307 and 308 over a path hereinafter to be traced. This potential is also applied to the right-hand control anode 302 of the tube. The right-hand control cathode 304 of tube U(3) is connected to negative battery, which may supply a negative 48-volt potential, through resistors 309 and 310 and through the winding of relay U(3). Resistor 309 should have a high value of resistance as indicated in the drawing. In the disclosed embodiment, with the potentials applied, and with the characteristics of the particular tube utilized, resistor 309 has been found to best serve its function if its resistance is approximately 22 megohms. With these applied potentials and with high resistance resistor 309 in the external circuit, a current of a few microamperes flows across the right-hand control gap of tube U(3), i. e., between control anode 302 and control cathode 304. This current is maintained at a value below the threshold current of the tube, but is such that upon the application of a suitable potential difference across the left-hand control gap of the tube, breakdown will occur considerably more rapidly than would otherwise be the case. This "keep-alive" current is interrupted when the main anode voltage is removed, as will be described hereinafter.

*Power supply and pulse generating circuit*

In the exemplary embodiment of the invention, it is assumed that a source of approximately negative 48-volt potential and a source of positive 135-volt potential are available. The power supply circuit at the left of Fig. 1 supplies other regulated direct voltages, herein assumed to be positive and negative 150 volts, as well as a filament supply.

Referring to Fig. 1 of the drawing, a conventional regulated power supply system is represented, comprising transformer T(1), double diode V1(1), triode V2(1), pentode V3(1), and gas diode V4(1). With the primary winding connected to a suitable source of alternating voltage, transformer T(1) provides filament power for tubes V1(1), V2(1), V3(1), and P(1) and for all other vacuum tubes in the remaining portion of the test system, i. e., vacuum tubes B(1) and DT(2) over obvious paths. Transformer T(1) also provides high voltage to the plates of rectifier V1(1), and that rectifier supplies negative 150-volt potential over conductor 101. The high voltage output of rectifier V1(1) is connected through the plate-cathode circuit of triode V2(1) to supply a positive 150-volt potential over conductor 102. Pentode V3(1) and diode V4(1) respond to changes in output voltage to control triode V2(1) to regulate the voltage between leads 101 and 102 in the normal fashion. It may be noted that this power supply system is conventional and any suitable power supply may be employed.

The pulse generating circuit shown at the upper left of Fig. 1 is operative to transmit two types of pulses to the test circuit. Alternator 103 supplies a suitable alternating voltage, herein assumed to be of a frequency of 20 cycles per second, to the grids of vacuum tube P(1). That tube operates in the well-known manner to amplify the positive half cycles. Since the winding of relay P(1) is in the plate circuit of tube P(1), relay P(1) will be operated during the positive half cycles and released during the negative half cycles. Relay P(1), when released, connects positive 135-volt battery to conductor 104, and in operating removes that battery. Therefore, twenty square wave positive pulses are transmitted over conductor 104 per second. Conductor 104 is connected to ground through resistor 105, and the pulses on that conductor are employed in the simulating of dialing as will be seen hereinafter.

Capacitor 106, the upper electrode of which is connected to conductor 104, and resistor 107, which is connected to ground, constitute a differentiating circuit to supply a sharp positive voltage pulse over conductor 108 at the beginning of each square wave pulse transmitted over conductor 104. Conductor 108 is connected to the left-hand control anode of gaseous discharge tube A(1) through resistor 109 for a purpose hereinafter to be described.

*Originating call*

In the operation of the subject test system, the circuits initially operate to accomplish those functions normally performed by the calling subscriber. In general, the "start" tube ST(1) is initially fired to operate "start" relay ST(1) which bridges the "calling subscriber's" line to simulate the closing of the switch-hook contacts. The system then awaits the return of dial tone from the automatic telephone system under test, and at the receipt of that signal, "dial tone" tube DT(2) is fired to operate "dial tone" relay DT(2). This relay serves to complete certain connections whereby tube A(1) is fired on the next pulse on conductor 108, operating relay A(1). Relay A(1), in operating, causes tube B(1) to become conductive which causes relays B1(1) and B2(1) to operate and release in accordance with the pulses on conductor 104, thereby opening and closing the "calling" or originating line to represent dial pulses. A time delay resistance-capacitance network regulates the length of time during which tube B(1) is conductive, and therefore controls the number of dial pulses transmitted. The time constant of this network is initially controlled by the setting of the "hundreds" switch H(3). At the end of the transmission of the hundreds digit, "end-of-dialing" tube ED(1) is fired to operate relay ED(1) which performs certain control functions. After an adjustable "interdigital" delay interval, tube ID(1) fires to extinguish tube ED(1) and release relay ED(1). Pulses are then transmitted in accordance with the setting of the "tens" switch T(3) to represent the desired tens digit. The ensuing digits of the assumed four-digit telephonic designation are then transmitted, and the circuits are restored to await the terminating phase of the call, hereinafter to be described.

*Start of call*

The test circuit is placed in operation by the closing of switch SW1(1). Positive 135-volt battery is thereby connected to conductor 110 which is cabled to Fig. 3, No. 1 contact of relay AL(3), conductor 312 which is cabled back to Fig. 1, and which then extends to a number of points in the system as will be seen hereinafter. The positive 135-volt potential on conductor 312 is applied through resistor 114 to the upper electrode of capacitor 115, the lower electrode of which is connected to negative 48-volt battery. Capacitor 115 therefore commences to charge and a rising potential is applied through resistor 116 to the left-hand control anode of "start" tube ST(1). The left-hand control cathode of tube ST(1) is connected to negative battery through resistor 117, and the main cathode thereof is also connected to this negative potential source. The main anodes of tube ST(1) are connected via conductor 118, resistor 119, winding of relay ST(1), conductor 120, and resistor 121 to positive 135-volt battery on conductor 312. Therefore, after a suitable adjustable delay interval, tube ST(1) will undergo a control gap discharge and first and second transfers of discharge whereby "start" relay ST(1) will be operated.

Relay ST(1), in operating, closes ground through its No. 1 contact to light "start" lamp 122, and closes a discharging path for capacitor 115 through its No. 5 contact and through low resistance resistor 123. Relay ST(1), in operating, also establishes a bridge across the originating line to simulate the closing of the switchhook contacts in the calling subscriber's set. Conductors OT and OR are the tip conductor and ring conductor, respectively, of the originating line, and are to be extended to the proper points in the automatic telephone switching system under test as is represented in Fig. 2. The originating tip conductor OT is connected through resistor 124, through the back contact of unoperated relay B2(1), conductor 125, No. 4 contact of operated relay ST(1), resistor 126, and to the originating ring conductor OR.

Relay ST(1), in operating, also completes a circuit from positive 135-volt battery on conductor 312, resistor 127, No. 2 contact of relay ST(1), conductor 128, and to the upper electrode of capacitor 313, the lower electrode of which is connected to negative battery. It may be noted that capacitor 313 cannot charge at this time due to the shunting path comprising conductor 128, No. 4 contact of unoperated relay DT(2), conductor 201, No. 2 contact of unoperated relay DC(3), resistor 314, and negative battery. Relay ST(1), in operating, also connects the positive 135-volt potential on conductor 312 through resistor 132, through its No. 3 contact, and to conductor 133 which extends to the main anodes and to the right-hand or "keep-alive" control anodes of the counting tubes H(3), T(3), U(3), R(3) and DC(3) for a purpose hereinafter to be described.

Relay ST(1), in operating, also extends the positive 135-volt potential on conductor 312 through its No. 6 contact, conductor 134, and to ground through resistor 135 whereby a positive potential is applied to the upper electrode of capacitor 316. The lower electrode of capacitor 316 is connected to ground through resistor 317 and therefore a positive pulse is applied to the left-hand control anode of "hundreds" control tube H(3). The left-hand control cathode of tube H(3) is grounded through the network comprising resistors 318 and 319 and capacitor 320. The main cathode is connected to negative battery through resistor 321 and through the winding of "hundreds" relay H(3), and through the additional parallel path comprising resistor 322 and capacitor 323. Therefore, tube H(3) will undergo a control gap discharge and first and second transfers of discharge whereby relay H(3) will be operated.

Relay H(3), in operating, closes ground through its No. 3 contact to light lamp 324. Relay H(3), in operating, also completes a circuit from the originating line at a point between resistor 124 in the tip conductor OT and resistor 126 in the ring conductor OR, conductor 125 which is cabled to Fig. 3, No. 2 contact of operated relay H(3), conductor 325 which is cabled back to Fig. 1 and extends to Fig. 2, and to the upper electrode of capacitor 202, the lower electrode of which is grounded through resistor 203 and is also connected to the grid of the right-hand triode section of "dial tone" vacuum tube DT(2). The right-hand triode section of this tube is normally biased to cut-off by the negative battery applied to the grid thereof through resistor 204. When the audio frequency alternating current representing dial tone is received via the originating line, it is transmitted over the above-traced circuit and is applied tthrough capacitor 202 to the grid of the right-hand section of tube DT(2). The right-hand section of tube DT(2) amplifies this signal and applies it through capacitor 205 to the integrating circuit comprising rectifying element or varistor 206 and capacitor 207, and the direct-current output therefrom is applied through resistor 208 to the control grid of the left-hand triode section of tube DT(2). It may be noted that this section of tube DT(2) is normally biased to cut-off by the voltage divider comprising resistors 209, 210, 211 and 212, the latter of which may be varied to adjust the sensitivity of the dial tone detector by changing the bias on this section of the tube. The left-hand anode of tube DT(2) is connected through the winding of "dial tone" relay DT(2) to positive 135-volt battery on conductor 312. Therefore, when the amplified and integrated dial tone is applied to the grid of the left-hand triode section of tube DT(2), this section of tube DT(2) will conduct and relay DT(2) will be operated.

Relay DT(2), in operating, lights lamp 218 and locks operated over a circuit from positive battery on conductor 312, winding of relay DT(2), resistor 216, No. 3 contact of relay DT(2), conductor 217 which extends to Fig. 3, and to ground through the No. 3 contact of unoperated relay DC(3). Relay DT(2), in operating, also interrupts, at its No. 4 contact, the previously traced shunting path for capacitor 313, and that capacitor will therefore commence to charge for a purpose hereinafter to be explained.

It will be noted that prior to the operation of relay DT(2), the negative 150-volt potential on conductor 101 was connected through the No. 1 contact of relay DT(2), resistor 219, conductor 220, resistor 136, and to the grids of vacuum tube B(1). Upon the operation of relay DT(2), this bias is removed for a purpose hereinafter to be described. Relay DT(2), in operating, also completes a circuit from negative battery, winding of relay A(1), conductor 137, No. 2 contact of relay DT(2), conductor 223, No. 1 contact of unoperated relay ED(1), conductor 138, and through resistors 139 and 140 to the left-hand control and main cathodes, respectively, of gaseous discharge tube A(1).

Since the main anodes of tube A(1) are connected to positive battery via conductor 312, the next pulse applied from the pulse generating circuit via conductor 108 and resistor 109 to the left-hand control anode of tube A(1) will cause that tube to undergo a control gap discharge and first and second transfers of discharge and relay A(1) will be operated.

*Dialing*

Since the negative bias was removed from tube B(1) upon the operation of relay DT(2), as above described, and since the anodes of that tube are intermittently supplied with a positive 135-volt potential from conductor 104 and through the windings of relays B1(1) and B2(1) in parallel, tube B(1) will be rendered conductive and non-conductive to operate and to release relays B1(1) and B2(1) in accordance with the square wave pulses on conductor 104.

The alternate opening and closing of the contacts of relay B2(1) opens and closes the "calling subscriber's loop," i. e., momentarily disconnects the originating tip conductor OT from the originating ring conductor OR at a rate of twenty times per second, thereby simulating the opening and closing of the dial contacts in a subscriber's set.

The number of pulses which will be transmitted over the line by the operation and release of relay B2(1) is successively controlled by the setting of the switch banks in Fig. 3. Let it be assumed that a four-digit subscriber's designation is to be employed, with the final digit representing the ringing code to be employed in calling a subscriber on a multiparty line. The brushes of the "hundreds" bank H(3), of the "tens" bank T(3), of the "units" bank U(3), and of the "ringing code" bank R(3) are therefore set in the proper positions to represent the telephonic designation of the desired called line, i. e., that terminating line which appears herein as conductors TT and TR. It is herein assumed that the designation is "366—6" and the brushes of the bank of Fig. 3 are set accordingly. It may be noted that the brush of bank RN(3) is linked to the brush of bank R(3) for a purpose hereinafter to be described.

Referring again to Fig. 1, capacitor 143 is normally discharged through resistor 144. Upon the operation of relay A(1), this discharging path is interrupted and the upper electrode of capacitor 143 is connected through the front contact of relay A(1), conductor 220 which extends to Fig. 3, through the No. 1 contact of operated "hundreds" relay H(3), conductor 326, brush and No. 3 contact of "hundreds" switch bank H(3), and through resistors 334, 335 and 336 to the negative 150-volt potential on conductor 101. The lower electrode of capacitor 143 is connected to the positive 150-volt potential on conductor 102. Therefore, capacitor 143 will commence to charge, with an increasingly negative potential being applied via conductor 220 and resistor 136 to the control grids of tube B(1). When this potential becomes sufficiently negative, tube B(1) will be cut off. The length of time required for this to occur is controlled by the time constant of the circuit comprising capacitor 143, resistor 336, and any of the additional resistors 327 to 335 which are placed in series therewith by the positioning of the brush of the "hundreds" switch bank H(3). It is desirable that tube B(1) be cut off during one of the intervals during which relays B1(1) and B2(2) are released, and resistor 336 may be varied to provide this adjustment over a limited range. The value of resistor 336 is selected to provide a time constant such that tube B(1) will be cut off following the first operation of relays B1(1) and B2(1), resistor 335 is of proper value so that, in combination with resistor 336, it will cause the time constant of the resistance-capacitance network to be such that tube B(1) will cut off after the second operation of relays B1(1) and B2(1), and so on.

It may be noted that the time constant may also be adjusted to cause tube B(1) to cut off while relays B1(1) and B2(1) are released by varying the capacitance of capacitor 143. Means are provided for selectively placing additional capacity in parallel with capacitor 143. The upper electrode of capacitor 143 is connected via conductor 145 to the upper electrodes of capacitors 224 to 228. Conductor 102 is connected through the switch banks S1(2), S2(2) and S3(2) to the lower electrodes of a selected one of those capacitors or to a selected parallel combination thereof. Therefore, the effective capacity of capacitor 143 may be adjusted by the selective positioning of the brushes of bank S1(2), S2(2) and S3(2).

When capacitor 143 (and those of the capacitors 224 to 228 which are in parallel therewith) has charged sufficiently, tube B(1) will be cut off to prevent the further operation of relays B1(1) and B2(1). In this manner, the pulses representing the hundreds digit are transmitted, in this case, three pulses representing the hundreds digit "3."

At the time "dial tone" relay DT(2) operated, a circuit was completed from positive 135-volt battery on conductor 312, resistor 146, variable resistor 147, back contact of relay B1(1), conductor 148 which extends to Fig. 2, No. 5 contact of operated relay DT(2), and to conductor 230 which is connected to the upper electrode of capacitor 149, the lower electrode of which is connected to negative battery. A charging path was thereby created for capacitor 149, but at each operation of relay B1(1) during the above-described pulsing this charging path was opened and capacitor 149 was discharged through the front contact of relay B1(1), resistor 150, and to negative battery. However, at the end of the first digit, relay B1(1) remains unoperated and capacitor 149 charges, applying a rising potential through resistor 153 to the left-hand control anode of "end of dialing" tube ED (1). The left-hand control cathode of tube ED(1) is connected to negative battery through resistor 154 and the main anode is connected directly to negative battery. The main anodes of tube ED(1) are connected to positive 135-volt battery on conductor 312 through resistor 155 and through the winding of relay ED(1). Tube ED(1) will therefore undergo a control gap discharge and first and second transfers of discharge whereby "end of dialing relay ED(1) will be operated.

Relay ED(1), in operating, closes a discharge path for capacitor 149 through its No. 3 contact, resistor 156 and to negative battery. Relay ED(1), in operating, also interrupts, at its No. 1 contact, the previously traced main cathode circuit of tube A(1), extinguishing tube A(1) and releasing relay A(1). Relay A(1), in releasing, reestablishes the discharge path for capacitor 143 and capacitors 224 to 228.

Prior to the operation of relay ED(1), the positive 135-volt potential on conductor 312 was applied through resistor 157, through resistor 158 to ground and to the upper electrode of capacitor 159, the lower electrode of which is grounded through resistor 160. With the selected parameters, capacitor 159 is therefore normally charged to about positive 25 volts. Upon the operation of relay ED(1), resistor 157 is by-passed by the closure of the No. 2 contact of that relay and, as a result, a pulse of approximately positive 100 volts is transmitted over conductor 161 which extends to Fig. 3. This positive pulse on conductor 161 is applied through capacitor 340 to 343, through resistance-capacitance parallel networks 344 to 347, respectively, and through resistors 348 to 351, respectively, to the left-hand control anodes of the tens control tube T(3), of the units control tube U(3), of the ringing-code control tube R(3) and of tube DC(3), respectively. The left-hand control anode of tube U(3) is biased negatively by being connected to negative battery via resistor 349, network 345, resistor 352, through resistor 353 and the winding of relay T(3), and, in parallel therewith, through resistor 354. The left-hand control anodes of tubes DC(3), R(3) and T(3) are connected to negative battery by similar circuits.

Since tube H(3) is conducting, however, and since capacitor 323 in the main cathode circuit thereof has had ample time to become fully charged, the main cathode potential of tube H(3) has risen, with the utilized parameters, to approximately 25 volts positive whereby the left-hand control anode of tube T(3) is biased positively. Therefore, this pulse on coductor 161 will cause a discharge to occur from the left-hand control anode of tube T(3), left-hand control cathode, resistor 355, network 356 and to ground. Since tubes U(3), R(3) and DC(3) are biased negatively, the pulse on conductor 161 at this time will be ineffective to cause any of those tubes to undergo a control gap discharge. Since the main anodes of this group of tubes are connected to positive battery via conductor 133 and through the common main anode impedance comprising resistor 132, and since the main cathode of tube T(3) is connected to negative battery through resistor 353 and the winding of relay T(3), through capacitor 357, tube T(3) will undergo first and second resistor 354 and through capacitor 357, tube T(3) will undergo first and second transfers of discharge.

By virtue of the presence of capacitor 357, the main cathode potential of tube T(3) cannot change instantaneously, and therefore momentarily remains considerably negative. The main cathode of tube H(3) has risen to a positive potential as above described. Therefore, the additional drop in potential across common main anode impedance 132 due to conduction through tube T(3) will reduce the potential across tube H(3) below sustaining, and tube H(3) will be extinguished, releasing relay H(3). Tube T(3) is not extinguished and after capacitor 357 has become charged, relay T(3) will be operated. Relay H(3), in releasing, disconnects conductor 220 from the brush of the hundreds selector switch H(3) and relay T(3), in operating, connects this conductor to the brush of the tens selector switch T(3).

When relay ED(1) was operated as above described, it interrupted a discharging path for capacitor 162, comprising negative battery, resistor 156, No. 4 contact of relay ED(1), conductor 163 and to the upper electrode of capacitor 162, the lower electrode of which is connected to negative battery. Capacitor 162 will therefore commence to charge from positive battery on conductor 312 and through variable resistor 164. This rising potential is applied to the left-hand control anode of "interdigital" tube ID(1). Tube ID(1) will therefore undergo a control gap discharge and first and second transfers. It may be noted that the time constant of the resistance-capacitance network comprising resistor 164 and capacitor 162 may be adjusted by varying resistor 164, thereby controlling the "interdigital" delay period. The main anodes of tubes ID(1) and ED(1) are coupled through capacitors 165 and 166 to form a parallel control circuit and, therefore, upon the firing of tube ID(1), tube ED(1) will be extinguished, releasing "end of dialing" relay ED(1).

Relay ED(1), in releasing, reestablishes the previously traced circuits including the main cathode circuit of tube A(1). Therefore on the next pulse via conductor 108, tube A(1) will again fire to operate relay A(1). Relay A(1) causes the circuit to transmit dial pulses over the originating line in the same manner as above described except that the number of those pulses is now controlled by the setting of the tens selector switch T(3). The above-described process is then repeated for the units and ringing code digits with tubes U(3) and R(3) successively firing and commutating out the previous tube.

*Completion of dialing*

After the transmission of the last or ringing code digit, "end of dialing" tube ED(1) is again fired to operate relay ED(1) as above described. Since tube R(3) was conducting, only tube DC(3) will be biased positively and that tube will fire, operating relay DC(3), extinguishing tube R(3) and releasing relay R(3).

Relay DC(3), in operating, disables tube B(1) by completing a path from the grid thereof, resistor 136, conductor 220, No. 1 contact of relay DC(3), resistor 338 and to the negative potential on conductor 101. Relay DC(3), in operating, also disconnects, at its No. 2 contact, negative battery from conductor 201 to prevent the discharge of capacitor 313 upon the subsequent release of relay DT(2). Relay DC(3), in operating, also interrupts, at its No. 3 contact, the previously traced holding path for relay DT(2), releasing that relay. Relay DT(2), in releasing, interrupts, at its No. 2 contact, the main cathode circuit of tube A(1) to prevent further dialing.

As above described, after a suitable interval, tube ID(1) is fired to extinguish tube ED(1) to release relay ED(1).

*Terminating call*

In general, the system now awaits the transmission of ringing current. It responds to the receipt therof by the operation of relay RN(2) which results in the operation of relays R1(2) and R2(2). At the first "silent interval," the system is operative to trip ringing and to hold the automatic switching system under test in the equivalent of the talking condition for a controllable period. Thus, relay RN(2) releases to release relay R1(2). At the release of relay R1(2), a capacitor commences to charge, and, after the desired interval, "hold" tube HD(2) is fired to operate relay HD(2). Tube HD(2), in firing, also exinguishes "start" tube ST(1) to release "start" relay ST(1). Relay HD(2), in releasing, releases relay R2(2) which initiates the next phase of the operation of the system, hereinafter to be described.

*Ringing*

When dialing has been completed, the system, now simulating the functions normally performed by the "called" subscriber and the called subscriber's set, awaits ringing voltage. Certain automatic telephone systems are operative to transmit this ringing voltage over the terminating tip conductor or over the terminating ring conductor in accordance with the telephonic designation of the called subscriber. One such system is disclosed in the application of W. A. Cornell, N. I. Hall, G. Hecht, C. D. Koechling, F. A. Korn, and H. E. Powell Serial No. 114,392, filed September 7, 1949, which is operative to transmit the ringing voltage over the tip conductor if the ringing-code digit of the called subscriber's designation is even-numbered, and over the ring conductor if it is odd-numbered.

Although this feature may readily be disabled if the subject test system is associated with a telephone switching system not possessing this capability, means are provided to test that the ringing voltage is applied to the proper conductor in accordance with the ringing-code digit "dialed." Thus, as previously mentioned, the brush of selector switch RN(3) is linked to the brush of the ringing code switch R(3). If the ringing-code digit is an odd-numbered digit, the brush of switch RN(3) is connected to the terminating ring conductor TR. If, as shown, the ringing code digit is an even-numbered digit, the terminating tip conductor TT is extended through the No. 6 contact and brush of switch RN(3), conductor 361 which extends to Fig. 2, resistor 234, and to ground through the winding of polarized "ring" relay RN(2).

When ringing voltage is received on the terminating tip conductor TT, relay RN(2) operates, following the ringing-current alternations. At the first operation of relay RN(2), ground is connected through the front contact thereof to operate relay R1(2) and that relay remains operated through the alternations since it is slow to release by virtue of the varistor 235 in shunt of the winding thereof. It may be noted that if ringing voltage is improperly received on the ring conductors TR, a time-out will occur to introduce an alarm condition as will hereinafter be discussed.

Relay R1(2), in operating, closes ground through its No. 4 contact to operate relay R2(2). Relay R2(2), in operating, locks through its No. 3 contact, conductor 236, No. 1 contact of unoperated relay HD(2) and to ground. Relay R2(2), in operating, also completes a path from negative battery, resistor 237, No. 1 contact of operated relay R1(1), conductor 238, No. 1 contact of relay R2(2), conductor 239 and to the upper electrode of capacitor 240, the lower electrode of which is connected to negative battery, thereby holding capacitor 240 in a discharged condition.

*Tripping and holding*

When the system under test first ceases to transmit ringing voltage, i. e., during the first "silent interval," relay RN(2) is released long enough for relay R1(2) to release. Relay R1(2), in releasing, completes a bridge across the terminating line to trip ringing, this loop being traced from the terminating tip conductor TT, resistor 244, No. 2 contact of released relay R1(2), No. 2 contact of operated relay R2(2), and to the terminating ring conductor TR.

Relay R1(2), in releasing, also interrupts the previously traced discharging path for capacitor 240 and allows that capacitor to charge from positive battery on conductor 312, variable resistor 445, conductor 238, No. 1 contact of relay R2(2), and conductor 239. A rising potential is thereby applied through resistor 246 to the left-hand control anode of "hold" tube HD(2). The main cathode of tube HD(2) is connected to negative battery and the left-hand control cathode thereof is connected to negative battery through resistor 247. The main anodes of tube HD(2) are connected via resistor 248, winding of relay HD(2), conductor 120, resistor 121 and to positive battery on conductor 312. Therefore, after a suitable holding interval controlled by the capacitance of capacitor 240 and the adjustment of variable resistor 445, tube HD(2) will undergo a control gap discharge and first and second transfers of discharge and "hold" relay HD(2) will be operated. It may be noted that the main anodes of the "start" tube ST(1) and of the "hold" tube HD(2) are interconnected through capacitors 165 and 249 to form a parallel control circuit. Therefore, upon the firing of tube HD(2), tube ST(1) will be extinguished and relay ST(1) will be released.

Relay HD(2), in operating, interrupts the previously traced locking path to release relay R2(2) and applies ground through its No. 2 contact to conductor 250 which extends to the representation of an alarm circuit in Fig. 3. This ground on conductor 250 may be employed as an indication that a communication path has been established and may operate a traffic register to record that fact.

*Release of call and recycle*

Relay R2(2), in releasing, removes the previously traced holding bridge across the terminating line, thereby simulating the reopening of the switchhook contacts by the called subscriber. Relay R2(2), in releasing, also interrupts, at its No. 1 contact, the previously traced charging path for capacitor 240.

Relay ST(1), in releasing, opens, at its No. 4 contact, the previously traced holding bridge across the originating line to simulate the reopening of the calling subscriber's switchhook contacts. Relay ST(1), in releasing, also opens, at its No. 2 contact, the previously traced charging path for capacitor 313. Relay ST(1), in releasing, also removes, at its No. 5 contact, the shunt around capacitor 115 whereby that capacitor commences to charge.

Relay ST(1), in releasing, also interrupts, at its No. 3 contact, the supply of positive battery to the main anodes and "keep-alive" control anodes of tubes H(3), T(3), U(3), R(3) and DC(3), thereby extinguishing tube DC(3) and causing the release of relay DC(3). Relay DC(3) in releasing, reestablishes, at its No. 2 contact, the previously traced discharging path for capacitor 313.

After a selected time interval, determined by the charging time of capacitor 115, "start" tube ST(1) will again be fired to again initiate the functioning of the test circuit to establish an originating and terminating call through the telephone system under test. This recycling will continue to occur until the power is disconnected such as by opening switch SW1(1), or, if desired, an alarm condition may block further operation of the test circuit until it is manually released.

*Time-out circuit*

It will be recalled that when "dial tone" relay DT(2) was operated in response to the receipt and detection of dial tone, a discharging shunt was removed from capacitor 313 and that capacitor then commenced to charge over the previously traced path including resistor 127. Therefore, a rising potential is applied through resistor 363 to the right-hand control anode of "alarm" tube AL(3). The right-hand control cathode of that tube is grounded through resistor 364, the main anodes thereof are supplied with positive battery on conductor 312, and the main cathode of tube AL(3) is connected to negative battery through resistor 365 and the winding of relay AL(3). If the normal events as above described which causes capacitor 313 to be shunted do not occur, i. e., if the call is not completed, tube AL(3) will undergo a control gap discharge and first and second transfers of discharge and relay AL(3) will be operated.

Relay AL(3), in operating, lights alarm lamp 366 and locks through its No. 2 contact, conductor 367 and to ground through a back contact of switch SW2(3). Relay AL(3), in operating also may be arranged to interrupt, at its No. 1 contact, the connection whereby the positive 135-volt battery on conductor 110 was applied to conductor 312 and thereby extended throughout the system. This will extinguish tube AL(3), disable the test system further to proceed, and cause the telephone switching system under test to be held in its present condition so that the malfunctioning therein may be ascertained.

Relay AL(3), in operating, also extends ground through its No. 3 contact, conductor 368, back contact of switch SW2(3), and to conductor 369. This ground may be utilized to cause an alarm to be sounded. A suitable alarm circuit capable of responding to this ground is disclosed in the above-cited application of W. A. Cornell et al.

The operation of switch SW2(3) will light lamp 370, will remove the ground from conductor 369, and will release relay AL(3) so that the subject test system may proceed with its operation.

It is to be understood that the above-described arrangements are but illustrative of the application of the principles of the invention. Numerous other arrangements may be devised by those skilled in the art without departing from the spirit and scope of the invention.

What is claimed is:

1. A test circuit for testing telephone switching systems comprising a plurality of gaseous discharge devices, apparatus including said discharge devices for initiating calls, means for receiving electrical signals transmitted from the system undergoing tests responsive to the initiation of a call by said apparatus, and trouble indicating means controlled by said signal receiving means.

2. In a circuit for testing telephone switching systems of the type operable to transmit dial tone when ready to respond to dial pulses, a line connecting the test circuit to the switching system under test, apparatus for transmitting pulses over said line, circuit means including an electron discharge device operative in response to dial tone received from the system under test over said line, and means controlled by said circuit means for starting the operation of said apparatus.

3. In a circuit for testing telephone switching systems of the type operable to transmit dial tone when ready to respond to dial pulses, a line connecting the test circuit to the switching system under test, apparatus for transmitting pulses over said line, circuit means including an integrating network and an electron discharge device associated with said line and operable in response to dial tone received from the system under test over said line, and means controlled by said circuit means for starting the operation of said apparatus.

4. In a pulse transmitting apparatus, means for transmitting a selectable number of pulses comprising an electron discharge device, means rendering said device conductive, means operative in response to conduction through said device for transmitting a plurality of pulses, and means for adjustably controlling the duration of conduction through said device so as to control the number of said pulses comprising a capacitor, a multiposition switch and a plurality of resistors selectively connectable to said capacitor by said switch.

5. In a pulse transmitting system, means for transmitting a selectable number of pulses comprising an electron discharge device, pulse transmitting means operative while said device is conducting for transmitting a plurality of pulses, means rendering said device conductive, and means for cutting off said device after a selectable time interval so as to control the number of pulses transmitted comprising a capacitor, a multiposition switch and a plurality of resistors selectively connectable to said capacitor by said switch.

6. A pulse transmitting system comprising an electron discharge device, pulse transmitting means operative while said device is conducting, means rendering said device conductive, a plurality of means each operable to cut off said device after selectable time intervals, and means effective each time said device is cut off for operating the next successive one of said plurality of means.

7. A pulse transmitting system comprising an electron discharge device, pulse transmitting means operative while said device is conducting, means rendering said device conductive, a plurality of gaseous discharge devices, apparatus individual to each of said gaseous discharge devices and responsive to conduction therein for cutting off said electron discharge device after selectable time intervals, and means effective each time said electron discharge device is cut off for rendering the next successive one of said gaseous discharge devices conductive.

8. In a pulse transmitting system means for transmitting a selectable number of pulses comprising an electron discharge device, pulse transmitting means operative while said device is conducting for transmitting a plurality of pulses, means rendering said device conductive, apparatus for cutting off said device after a selectable time interval so as to control the number of pulses transmitted comprising a capacitor, a multiposition switch and a plurality of resistors selectively connectable to said capacitor by said switch, and means including a gaseous discharge device controlled by said pulse transmitting means for enabling said apparatus.

9. A pulse transmitting system comprising an electron discharge device, pulse transmitting means operative while said device is conducting, means rendering said device conductive, means including a gaseous discharge device for cutting off said electron discharge device after a first selectable interval, apparatus including a gaseous discharge device operative upon discontinuance of the operation of said pulse transmitting means, and means including a gaseous discharge device controlled by said apparatus for cutting off said electron discharge device after a second time interval.

10. A pulse transmitting system comprising an electron discharge device, pulse transmitting means operative while said device is conducting, means rendering said device conductive, a plurality of gaseous discharge devices, means individual to each of said gaseous discharge devices and operable in response to conduction therein for cutting off said electron discharge device, and means including a gaseous discharge device operative at each discontinuance of the operation of said pulse transmitting means for rendering said plurality of gaseous discharge devices successively conductive.

11. A pulse transmitting system comprising an electron discharge device, pulse transmitting means operative while said device is conducting, means rendering said device conductive, means including a time delay network connected to said electron discharge device operative to cut off said device, and means including a plurality of successively operable gaseous discharge devices for successively controlling the time constant of said network.

12. A pulse transmitting system comprising an electron discharge device, pulse transmitting means operative while said device is conducting, first means rendering said device conductive, apparatus for cutting off said device after a selectable time interval, second means including a gaseous discharge device operative under the control of said pulse transmitting means for enabling said apparatus and for disabling said first means, and means including a gaseous discharge device controlled by said second means and after a selectable time interval for causing said second means to enable said first means.

13. In a circuit for testing telephone switching systems of the type operable to transmit dial tone when ready to respond to dial pulses, a pulse transmitting system comprising an electron discharge device, pulse transmitting means operative while said device is conducting, apparatus rendering said device conductive, and means for cutting off said device after a selectable time interval, and detecting means normally disabling said apparatus and responsive to the receipt of dial tone from the system under test for enabling said apparatus.

14. In a circuit for testing telephone switching systems of the type operable to transmit dial tone when ready to respond to dial pulses, a pulse transmitting system comprising an electron discharge device, pulse transmitting means operative while said device is conducting, apparatus rendering said device conductive, and means for cutting off said device after a selectable time interval, and means including an electron discharge device and an integrating network normally disabling said apparatus and responsive to the receipt of an alternating voltage from the system under test for enabling said apparatus.

15. In a circuit for testing telephone switching systems of the type operable to transmit dial tone when ready to respond to dial pulses, a pulse transmitting system comprising an electron discharge device, pulse transmitting means operative while said device is conducting, apparatus rendering said device conductive, a plurality of gaseous discharge devices, means individual to said devices and operable in response to conduction therein for cutting off said electron discharge device, means including a gaseous discharge device operative in response to each discontinuance of the operation of said pulse transmitting means for rendering said plurality of gaseous discharge devices successively conductive, and detecting means normally disabling said apparatus and responsive to the receipt of dial tone from the system under test for enabling said apparatus.

16. In a circuit for testing telephone switching systems of the type operable to transmit an alternating voltage signal, pulse transmitting apparatus settable selectively to transmit pulses representing the digits of a telephonic designation, two conductors connecting the test circuit to the switching system under test, alternating voltage responsive means, and means for connecting said alternating voltage responsive means to one of said conductors in response to certain settings of said apparatus and to the other of said conductors in response to certain other settings of said apparatus.

17. In a circuit for testing telephone switching systems, a terminating line, an impedance, apparatus operative to bridge said impedance across said line, a gaseous discharge device controlled by said apparatus for disabling said apparatus, and a delay network connected between said device and said apparatus for delaying the operation of said device.

18. In a circuit for testing telephone switching systems, an originating line, a terminating line, a first impedance, apparatus operable to bridge said first impedance across said originating line, a second impedance, first means operative to bridge said second impedance across said terminating line, a gaseous discharge device controlled by said first means for releasing said apparatus and said first means, and a delay network connected between said device and said first means for delaying the operation of said device.

19. In a circuit for testing telephone switching systems of the type operable to transmit an alternating voltage an originating line, an impedance, apparatus operable to bridge said impedance across said line, pulse transmitting means for transmitting pulses over said line, and detecting means operable in response to an alternating voltage transmitted from the system under test over said originating line for initiating the operation of said pulse transmitting means.

20. In a circuit for testing telephone switching systems of the type operable to transmit both dial tone and ringing voltage an originating line, a terminating line, an impedance apparatus operable to bridge said impedances across said originating line, pulse transmitting means for transmitting pulses over said line, detecting means operable in response to dial tone transmitted from the system under test over said originating line for initiating the operation of said pulse transmitting means, ringing voltage detecting means connected to said terminating line and operable in response to ringing voltage transmitted from the system under test over said terminating line, and means operable in response to the operation of said ringing voltage detecting means for releasing said apparatus.

21. In a circuit for testing telephone switching systems of the type operable to transmit both dial tone and ringing voltage, an originating line, a terminating line, a first impedance, apparatus operable to bridge said first impedance across said originating line, pulse transmitting means for transmitting pulses over said line, detecting means operable in response to dial tone transmitted from the system under test over said originating line for initiating the operation of said pulse transmitting means, ringing voltage detecting means connected to said terminating line and operable in response to ringing voltage transmitted from the system under test over said terminating line, a second impedance, control means operable in response to said ringing voltage detecting means for bridging said second impedance across said terminating line, and means operable in response to said control means and after a selectable interval for releasing said apparatus and said control means.

22. In a circuit for testing telephone switching systems of the type operable to transmit alternating voltage signals, a line connecting the test circuit to the switching system under test, apparatus connected to said line for operation by the alternaing voltage signal applied thereto by the system under test over said line, an impedance, means controlled by said apparatus for bridging said impedance across said line, and circuit means including timing means for opening said bridge.

23. In a circuit for testing telephone switching systems of the type operable to transmit alternating voltage signals, a line connecting the test circuit to the switching system under test, apparatus connected to said line for operation by the alternating voltage signal applied thereto by the system under test over said line, an impedance, means controlled by said apparatus for bridging said impedance across said line, circuit means for opening said bridge, and timing means for operating said circuit means a predetermined interval of time after the closure of said bridge.

References Cited in the file of this patent

UNITED STATES PATENTS

| Number | Name | Date |
|---|---|---|
| 2,153,293 | Blount | Apr. 4, 1939 |
| 2,169,821 | Smart | Aug. 15, 1939 |
| 2,319,333 | Logan | May 18, 1943 |
| 2,320,076 | Hall | May 25, 1943 |
| 2,326,478 | Meacham | Aug. 10, 1943 |
| 2,338,218 | Vroom | Jan. 4, 1944 |
| 2,361,766 | Hadekel | Oct. 31, 1944 |
| 2,398,771 | Compton | Apr. 23, 1946 |
| 2,400,574 | Rea et al. | May 21, 1946 |
| 2,414,443 | Busch | Jan. 21, 1947 |
| 2,414,624 | Wilson | Jan. 21, 1947 |
| 2,434,989 | Christian | Jan. 27, 1948 |
| 2,438,492 | Bascom | Mar. 30, 1948 |
| 2,457,892 | Hibbard | Jan. 4, 1949 |
| 2,471,415 | Deakin | May 31, 1949 |
| 2,582,691 | Fritschi | Jan. 15, 1952 |

"Ericsson Review," vol. XXII (1945), pages 59–62.
"Ericsson Review," vol. XV (1938), pages 79–81.